May 11, 1926.
H. P. BURRELL
1,584,212
APPARATUS FOR STORING MOTOR VEHICLES OR OTHER ARTICLES
Filed July 24, 1924
4 Sheets-Sheet 2
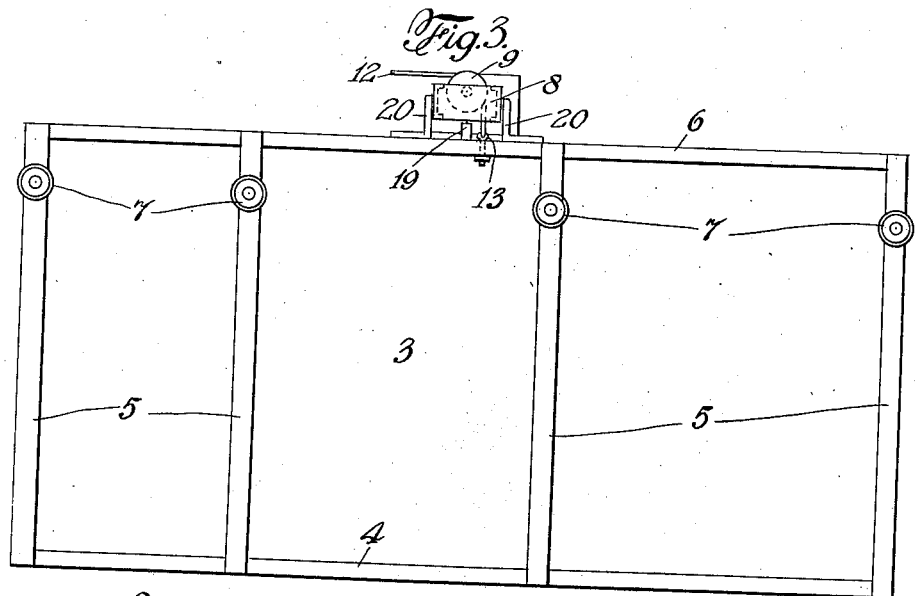
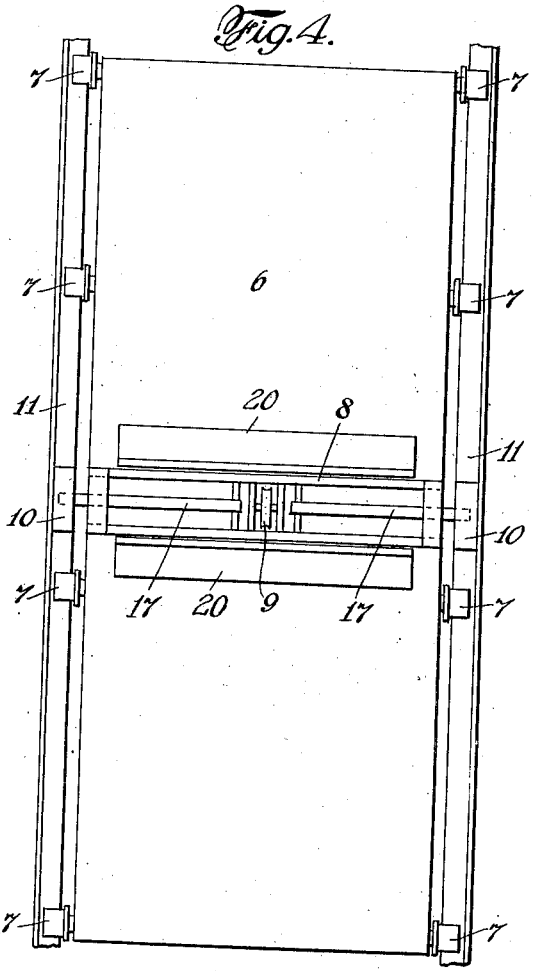
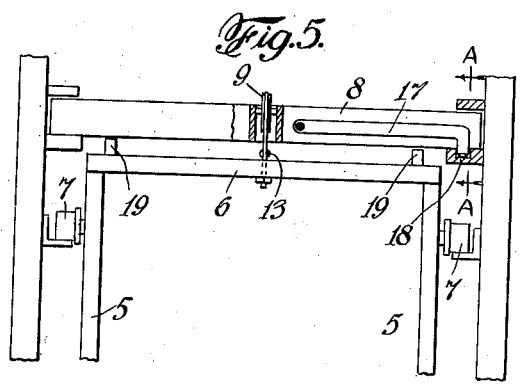
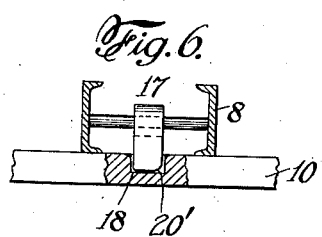
INVENTOR
Harold P. Burrell
BY
Kenyon & Kenyon
ATTORNEYS

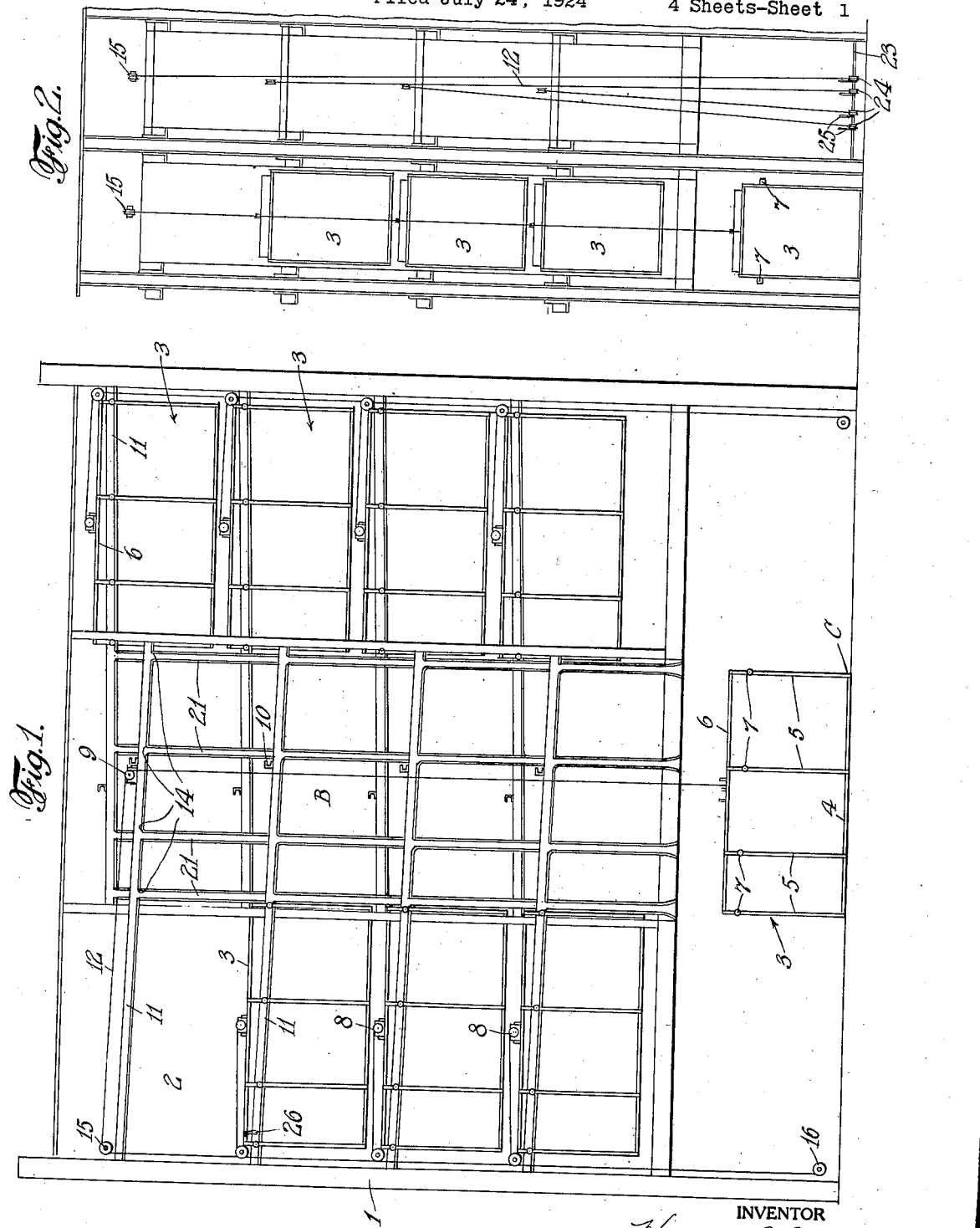

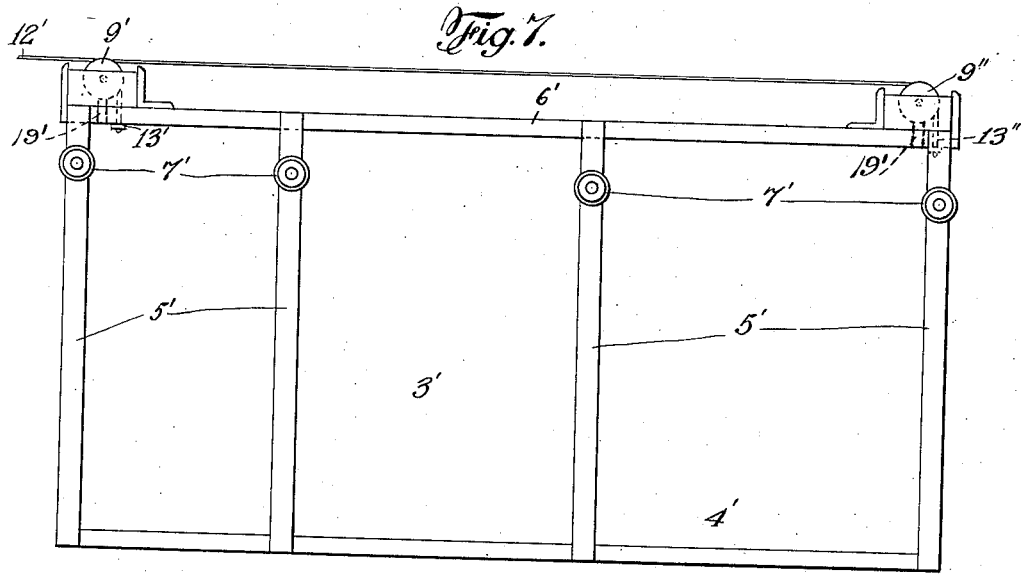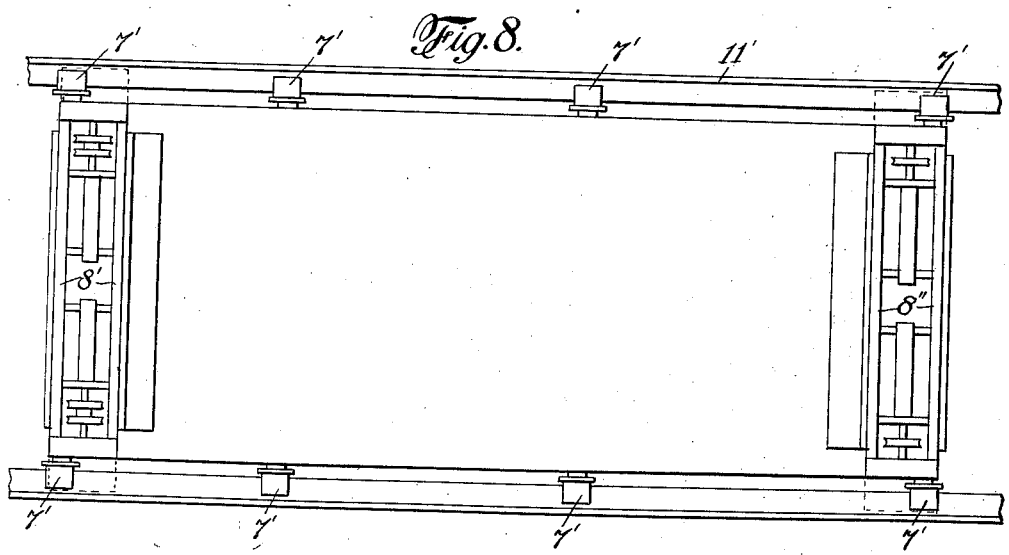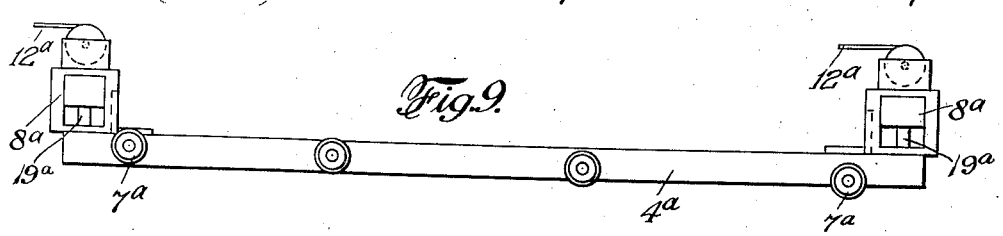

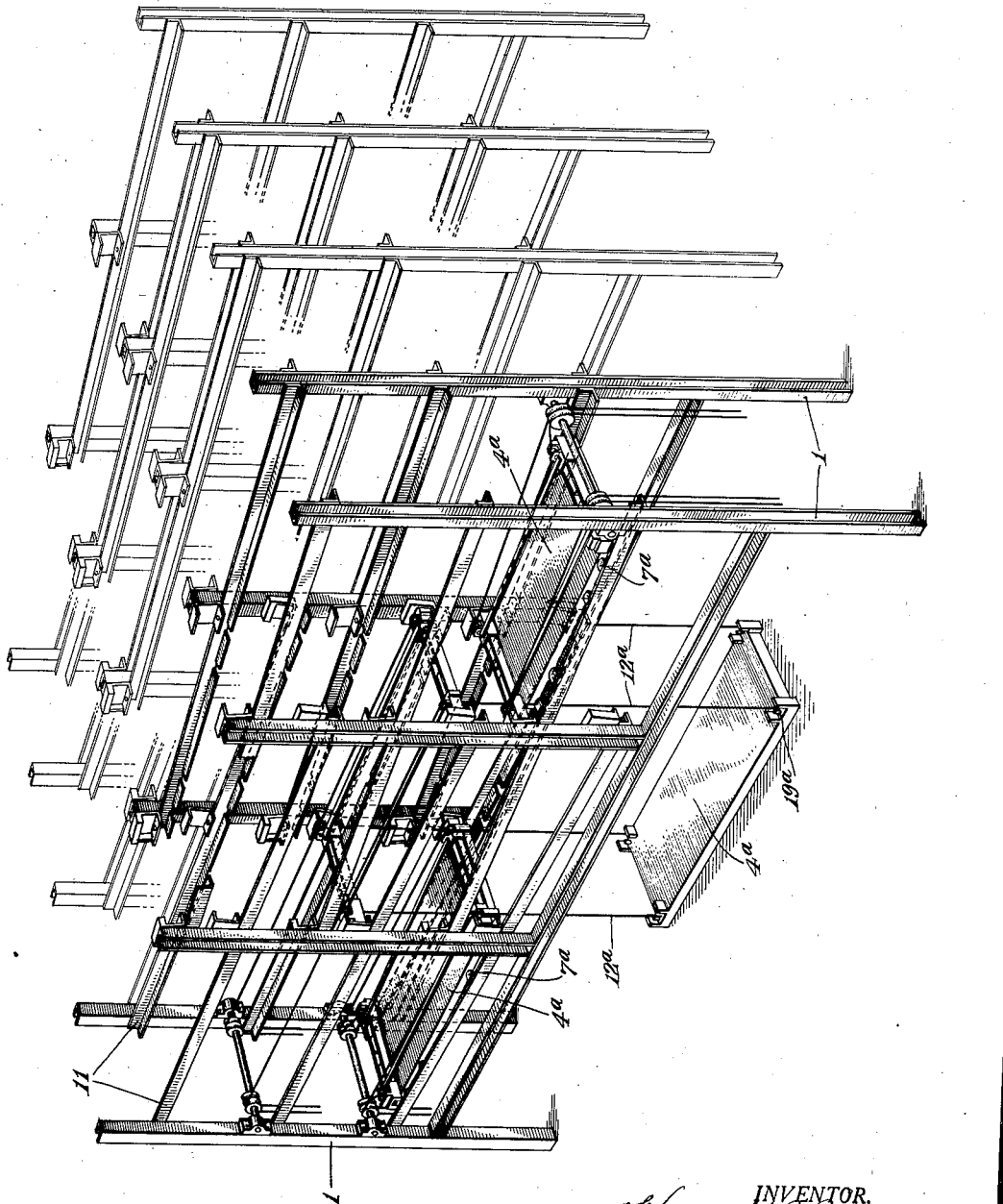

Patented May 11, 1926.

1,584,212

UNITED STATES PATENT OFFICE.

HAROLD P. BURRELL, OF NUTLEY, NEW JERSEY.

APPARATUS FOR STORING MOTOR VEHICLES OR OTHER ARTICLES.

Application filed July 24, 1924. Serial No. 727,888.

My invention relates to improvements in apparatus for the storing of motor vehicles or other articles, and has for its object the providing of a means by which motor vehicles or other articles can be readily and safely stored and at the same time be always accessible. It is well known that the problem of temporarily storing motor vehicles in congested districts is one that is steadily troubling those who are charged with the supervision of the traffic of our American cities. In my invention I have provided an apparatus whereby large numbers of motor vehicles can be stored in a small space and in a building which can be constructed without undue cost and yet one in which the separate motor vehicles can be quickly stored in their proper places and as easily reached when desired. In the present day garages, even of the most advanced type, cars can only be stored on successive floors and they can only be placed in their respective compartments through the use of a common elevator or other means of raising the cars from the street level to the storing floors. In these buildings a long time is required to successfully store each car and they are, therefore, in no wise suited for use as temporary storage buildings in the congested districts of a city or town, where, for example, people wish to drive to their business, store their cars safely during the day, and secure them again at night.

My invention comprises the use of a structure in which are provided a large number of cellular compartments for storing cars both above one another and in horizontal series. The cellular compartments of my invention can be constructed of skeleton framework and be just large enough to hold an individual car when supported on a suitable carrier, as hereinafter described. There is no need for floors or for the usual elevators or turning space, with the result that a large economy of space is secured. In my apparatus the cars are run onto the carrier on the ground floor and are automatically carried into their respective compartments. There is no necessity for any operator or person to accompany the carrier while the car is thus stored away. Each carrier and its contents are automatically accessible at all times without moving any other car or carrier. The result is that a very high speed of operation in storing and withdrawing cars is secured. On account of the absence of all floors, the building containing my structure can be made of much lighter construction than the present garages and with correspondingly less cost. Each car, together with its carrier, may be individually locked in its compartment and unauthorized access to the compartments can be entirely cut off. The danger of pilfering from the cars or the stealing of the cars themselves is eliminated. The structure having only a skeleton framework provides no fuel for fire and this fire risk can be reduced to an absolute minimum by the use of asbestos sheeting or similar material between the cells. The cars are merely run onto the carrier on the ground floor and the engine then stopped. The engines are never running after the carrier has left the ground. This factor alone reduces the fire risk and also the danger to the building from the vibration of the motor.

While the structure that I have described and shown is particularly applicable to the use of the storing of motor cars, it is readily seen that the same can be used for the storing of any other articles where it is desired to quickly store a large number of the articles away and yet where it is necessary to have the articles readily accessible, such, for example, as the storing of articles in warehouses and of papers and books, etc., in libraries. In some of these uses my apparatus would, of course, be made on a much smaller scale, as for instance when it is desired to store liquids in carboys, which can be stored only one deep on the floor entailing a great loss of room in the usual warehouse, but the principle would remain the same and be within the spirit of my invention, and it is my intention that my patent will be understood to cover all such structures which embody the principles of my invention.

My invention consists of the novel devices hereinafter shown, described and claimed. In the description and drawings I have shown my structure in its preferred form for the storing of motor vehicles. It is to be understood that I do not limit myself to this form shown but the embodiment of my invention can be carried out in various ways. The structure shown, however, is my preferred apparatus and means for the storing of motor vehicles.

Referring to the drawings, Fig. 1 is a side elevation of a structure embodying my invention and providing for two oppositely placed series of cellular storing compartments one above the other. The carriers for these cellular compartments are all shown in place except for the top left hand carrier which is shown in the lowered position on the ground floor ready to receive a motor vehicle.

Fig. 2 is an end elevation of the same and showing the manner in which the individual tiers of compartments one above the other may be coupled in horizontal series. The left tiers of cellular storing compartments shown in this figure contain their respective carriers except the top compartment, the carrier of which is shown in the lowered position. The tiers of compartments shown on the right are without their carriers. In the ordinary use of the apparatus these compartments would all be provided with carriers but they are left out of this drawing for the purpose of showing the pulley arrangement in the rear of said compartments.

Fig. 3 is a side view of one of the carriers used on my apparatus.

Fig. 4 is a top plan view of the same.

Fig. 5 is a view in end elevation of the top structure of the carrier. This view is partly in section.

Fig. 6 is a detailed cross-sectional view of the dog used for connecting and disconnecting the detachable member from the carrier. This view is taken along the line A—A of Fig. 5.

Fig. 7 is a side elevation of a modification of my carrier showing the use of two detachable members in place of the one in the other form.

Fig. 8 is a plan view of the same carrier.

Fig. 9 is a side illustration of a further modification of my carrier. In this modification the carrier consists of a carrying platform and has no roof or side posts.

Fig. 10 is a perspective view of a structure embodying the invention provided with the modified carrier shown in Fig. 9.

My structure is composed of a framework 1 which divides the space inside the structure into a series of cellular compartments 2, and also provides a central unencumbered space B just large enough to permit the passage upward and downward of the carriers from their cellular compartments to a position on the ground floor, as shown in C. These compartments are adapted so that each one can contain a carrier 3. This carrier is constructed of a floor 4, upright posts 5 and a roof 6. The posts 5 are each provided with wheels 7. These wheels are shown placed on the posts, but might also be attached to a special member, or to the roof or floor of the carrier. In the latter case the posts and roof could be eliminated as shown in Figure 9. These wheels are laterally placed on the sides of the posts of the carrier. The posts 5 and the wheels 7 are, as shown, placed at varying distances from each other. This is done for a purpose which will be hereinafter described. The carriers 3 are provided with detachable members 8. These latter members carry pulley wheels 9.

The framework 1 carries for each compartment a rail member 11 on which the wheels 7 are adapted to be supported when the carrier is in its cellular compartment or in the process of entering or withdrawing from the same except when the carrier is traveling in a vertical direction as hereinafter described. The rail members 11 are preferably placed at a slight grade, so that the carriers 3 will run by gravity on their wheels 7 when released, out of their cellular compartments into the open passageway B. Either on the rail members or otherwise fixed to the framework there are provided stops 10 which are adapted to hold the detachable member 8 and prevent when the carrier is moved into the open space its further horizontal motion.

The detachable member 8, when the carrier is in its cellular compartment or at the same elevation, is a fixed part of the carrier and held to the carrier by means of the cable 12 which runs over the pulley wheel 9 and is attached to the carrier at 13. It is to be understood that in place of a cable 12 a chain or other equivalent thereof can be substituted without departing in any way from my invention. However, when the cable is unwound sufficiently to permit the carrier to slide into the open space B, the detachable member is held from further horizontal movement by means of the stops 10 and the fixed connection between this member and the carrier ceases. The member 8, being held from further movement outward or downward, remains in its position while the carrier descends through the open space to the ground floor, as at C. When the cable is wound up in the other direction, the carrier and the member 8 become again fixed to each other.

The method of operation is as follows: The carrier being in position in the cellular compartment is held in place both by the cable 12 and also by any well known locking device, such as 26, which can automatically lock the carrier into position when it is so placed and be released by the pulling of a cable or lever below. When released, the carrier on account of the grade of the rail members 11, has a tendency to roll down the rail members into the open space B under its own weight. The speed of the rolling can be controlled by braking action on the cable 12. This lateral and slightly downward movement continues until the detachable member 8 runs against the stops 10. At this point each of the wheels 7 are over the slots 14. These slots have spaced relation to each other in the same manner as the wheels 7. Until the carrier is entirely within the open space B, these wheels 7 on account of their varying spaced relation, do not at any time all come over open slots. This occurs, however, when the carrier is in position in the open space and its horizontal motion is then free to change into downward motion. Prior to the carrier reaching the open space B there will be no tendency for any one of the wheels 7 to drop into any of the slots over which it passes because the carrier at that time will be supported by the other wheels. The wheels and slots are placed apart at varying distances so as to prevent more than one wheel being over a slot at any given time. The carriers for the opposite cells have the positions of their wheels reversed so as to have them able to use the same slots and guides. When the carrier is in position in the open space B, the further unwinding of the cable 12 will cause it to drop vertically, and this can continue until the carrier rests on the ground floor, as at C. There the motor car can be driven off. The cable 12, as previously stated, is attached to one end of the carrier at 13, runs over pulley wheel 9 on the detachable member 8, and again over the pulley 15, and thence to a power apparatus at 16. The cable for each compartment can be separately controlled by the use of any well-known gearing apparatus or clutch mechanism.

The carrier is returned either loaded or unloaded to its cellular compartment by the reverse operation. The motor apparatus 16 winds up the cable 12, raising the carrier 3 until it comes opposite its cellular compartment, when the top of the carrier engages the detachable member 8. During this upward movement the detachable member 8 has been held in position by a dogging means provided on the stops 10. This dogging means is particularly shown in Fig. 5. When the carrier is lowered the detachable member is held from outward horizontal motion by means of the stops 10. A dog member 17 is adapted to drop into holes 18 provided in the stops 10. This dog member prevents the inward motion of the detachable member 8 when the cable 12 is first wound up, and continues to prevent this inward motion of the member 8 until the carrier 3 is raised so that its top engages the detachable member. At that time the posts 19 on the top of the carrier are adapted to engage the dog member and release its teeth from the holes 18, thus permitting a horizontal inward motion of the detachable member 8, and permitting the carrier 3 to change its upward movement into a horizontal movement into its cellular compartment, where it is caught and held by the catch 26 previously described. Plates 20 located on the top of the carrier prevent horizontal movement of the member 8 without corresponding movement of the carrier. The top and bottom plates of the stop 10 in which the member 8 is caught while the carrier is being lowered or raised, prevent the rotation or overturning of the member 8 when a strain is put on the cable tending to hoist the carrier and to pull the member 8 horizontally.

The teeth of the dog member 17 can be provided with a rounded edge 20' and the holes 18 provided at their sides with a correspondingly rounded edge. This is shown in detail in Fig. 6. By means of this construction the dog member 17 when raised by the posts 19 gradually escapes from the slots 18, and the upward motion of the carrier is gradually changed into a horizontal and inward motion. The rounded edges of the dog teeth and the holes 18 prevent there being any whip action due to the sudden change of the upward motion of the carrier into the horizontal motion, with resulting strain on the cable. The guides 21 will then also be bent inwards so that the wheels 7 will be constantly in contact with them.

In Fig. 1 I have shown how my device can be used in connection with a double set of cellular compartments one above the other with a central space B in between to permit the separate carriers being raised and lowered to and from their respective compartments. In this structure I have provided two sets of these compartments, oppositely placed and facing each other. It can be seen that one passageway will do for the carriers located in all the compartments in both the sets. The passageway B can be provided with supporting guides 21 which will keep the carrier properly in place while it is being raised or lowered. As previously stated, the rail members 11 on which the wheels 7 are adapted to roll are preferably placed at a slight downward grade to permit the carrier to start its downward motion under the force of its own weight. In such construction the wheels on the carrier should be, as shown in Fig. 3, placed on a corresponding grade, so as to compensate for the grade of the rail members, and to leave the carrier itself in a horizontal position at all times. If preferred, the track made by the rail members can be made horizontal, in which case it will be necessary to provide some power for running the carrier out of its cellular compartment. This could be provided in any way desired. Furthermore, I have shown in my structure the carriers as being supported in their compartments by the rail members forming a track at the top of the carrier. The structure could be modified so as to provide that the carrier would be supported and rolled on a track of its own below, rather than be hung on a track above, or a modification of both methods could be used.

Safety devices similar to those used on all elevators may be used in connection with the hoisting and lowering of the carriers to their several compartments. I have illustrated in Fig. 2 the hoisting cable for a set of four compartments. A master shaft 23 can be operated by any motive power. Clutches 24, operated in any usual way, such as by the levers 25, can be adapted to make frictional contact with the master shaft 23 and to thereby control the hoisting or lowering of the carrier through its cable 12. Each cable 12 will thereby be operated independently, although from power secured from the same master shaft. Common forms of safety devices could be used in this connection, such as a frictional governor, to prevent the running away of any of the carriers or their too rapid descent. As I have previously described, the automatic locking devices 26 can be provided to catch and hold each of the carriers in its cell. Other devices for the purposes stated can be substituted for the means I have described for raising and lowering the carriers and for safely holding them in place, and for safety devices.

In Figs. 1-6 I have shown the carriers supported by single detachable members. Multiple detachable members can likewise be used with suitable rearrangement of stops and pulleys. In Figs. 7 and 8 I have shown my carriers as supported by double detachable members. The detachable members operate together in the same manner as in the case of single detachable members. The use of double detachable members may, however, support the carriers in more secure manner and be desirable in certain cases.

The construction of the carrier in this modification is the same as before, except that it is provided with double detachable members located at the ends of the carrier. Each of these detachable members is constructed as previously described and consists of the member 8', 8'', which is held to the carrier by cables 12', 12'' as before, running over pulley wheels 9', 9'', and are attached to the carrier at 13' and 13''. The cables 12', 12'', are operated together by the same hoisting apparatus. Similar dogging means is located in each of the detachable members, which is adapted to be lifted by posts 19' on the top of the carrier. The operation of the device is the same as before. It will be seen from this drawing and description that a very secure support for the carrier is provided, during its vertical movement, by means of this multiple system of detachable members. The carrier is held at each end and cannot sway. This item may be important where motor vehicles or other property on wheels is stored in these carriers.

A further modification of my carrier is shown in Figs. 9 and 10. In these figures the carrier consists only of a carrying platform $4^a$, and has no upright posts or roof. The carrying platform $4^a$ is provided with wheels $7^a$ offset vertically and spaced laterally at varying distances for the same purposes as described in connection with the other forms of carrier. The carrier is supported preferably by a double form of detachable members $8^a$, of a similar construction to those in the other modification. An advantage of using this form of construction is that less space is occupied than in the carrier provided with roof and upright posts, and further it is possible by removing some of the carrying platforms to permit one carrier to be loaded with material piled vertically higher than the height of its individual compartment. For this reason the cables $12^a$ can be detachably fixed to the platform. Any carrier may then be lowered and unhooked from its cables, the cables and the detachable member then being removed or returned to their cellular compartments. Their compartments are then available for use by the material carried by either the platforms below or above. This form of construction is particularly useful in connection with the storing of carboys. It is, of course, to be understood that this material may be either piled on the platform $4^a$ or may be hung from it by hooks or other means.

What I claim as new and desire to secure by Letters Patent is:

1. A storage structure of the character described, comprising a plurality of cellular compartments arranged above one another, a shaft common to said compartments, individual carriers for said compartments, and means individual to each carrier for moving it horizontally of its compartment and vertically of said shaftway.

2. A storage structure of the character described, comprising a pair of oppositely placed sets of cellular compartments arranged above one another, said framework providing a central space between said sets, a carrier normally located in each compartment and means individual to each carrier to raise and lower the same separately through said central space.

3. A storage structure of the character described, comprising a framework forming a plurality of vertically arranged cellular compartments and a carrier normally located in each compartment, each carrier being provided with a detachable member normally attached to said carrier but adapted to become detached when said carrier is permitted a vertical movement, said member being itself only permitted a substantially horizontal movement.

4. A storage structure of the character described, comprising a framework forming oppositely placed sets of vertically arranged cellular compartments, said framework providing a central space between said sets and a carrier normally located in each compartment, each carrier being provided with a detachable member normally attached to said carrier but adapted to become detached when said carrier is permitted a vertical movement, said member being itself only permitted a substantially horizontal movement.

5. A storage structure of the character described comprising a framework, a plurality of vertically arranged cellular compartments, said framework providing a space adjacent said compartments, a carrier normally located in each compartment, supporting tracks for each carrier, a detachable member for each carrier, stops for each member, a cable running over each detachable member, attached to the associated carrier, and means for separately operating said cables.

6. A storage structure of the character described comprising a framework, oppositely placed sets of vertically arranged cellular compartments providing a central elevating space between said sets, carriers normally located in said compartments, supporting tracks for said carriers leading from said compartments into said central space, detachable members for said carriers, stops for said members, cables individual to said carriers, and means separately operating said cables.

7. A storage structure of the character described comprising a framework, a plurality of vertically arranged cellular compartments, said framework providing a space adjacent said compartments, carriers normally located in said compartments, supporting tracks for said carriers running slightly downwardly from said compartments over said space, wheels on said carrier adapted to run in said tracks, said wheels being vertically offset to compensate for the grade of said track, detachable members for said carriers, stops for said members, cables running over said detachable members attached to said carriers, and means separately operating said cables.

8. A storage structure of the character described comprising a framework, a plurality of vertically arranged cellular compartments, said framework providing a space adjacent said compartments, carriers normally located in said compartments, supporting tracks for said carriers, said tracks running from said compartment into said space, means permitting said carriers to move vertically when over said space, detachable members for said carriers, stops for said members, cables running over said detachable members, attached to said carriers, and means separately operating said cables.

9. A storage structure of the character described comprising a framework, a plurality of vertically arranged cellular compartments, said framework providing a space adjacent said compartments, carriers normally located in said compartments, supporting tracks for said carriers, said tracks running from said compartment into said space, said tracks being provided with a plurality of irregularly spaced slots, wheels attached to said carriers adapted to run on said track, said wheels being correspondingly displaced laterally to correspond to said slots, detachable members for said carriers, stops for said members, cables running over said detachable members, attached to said carriers, and means separately operating said cables.

10. A storage structure of the character described, comprising a framework, a plurality of vertically arranged cellular compartments, said framework providing an elevating space adjacent said compartments, carriers normally located in said compartments, detachable members for said carriers, pulley means on said detachable members, cable means running over said pulley means and attached to said carriers, stops for said detachable members, and means operating said cables.

11. A storage structure of the character described, comprising a framework, a plurality of vertically arranged cellular compartments, said framework providing an elevating space adjacent said compartments, carriers normally located in said compartments, supporting tracks for carriers, detachable members carried by said carriers when at the elevation of their respective tracks, stops for said detachable members preventing outward or downward movement when carriers are over said space, cables running over said members and attached to said carriers, and means for operating said cables.

12. A storage structure of the character described, comprising a framework, a plurality of vertically arranged cellular compartments, said framework providing an elevating space adjacent said compartments, carriers normally located in said compartments, supporting tracks for carriers, detachable members carried by said carriers when at the elevation of their respective tracks, stops for said detachable members preventing outward or downward movement when carriers are over said space, cables running over said members and attached to said carriers, dogging mechanism for preventing inward motion of said members, and means for releasing automatically said dogging mechanism when carriers are raised to elevation of said tracks, and means for operating said cables.

13. A storage structure of the character described, comprising a framework, a plurality of vertically arranged cellular compartments, said framework providing an elevating space adjacent said compartments, carriers normally located in said compartments, supporting tracks for carriers, detachable members carried by said carriers when at the elevation of their respective tracks, stops for said detachable members preventing outward or downward movement when carriers are over said space, cables running over said members and attached to said carriers, dogging mechanism for preventing inward motion of said members, and posts on said carrier adapted to release said dogging mechanism as carrier is raised to elevation of said tracks, and means for operating said cables.

14. A storage structure of the character described, comprising a framework, a plurality of vertically arranged cellular compartments, said framework providing an elevating space adjacent said compartments, carriers normally located in said compartments, supporting tracks for carriers, detachable members carried by said carriers when at the elevation of their respective tracks, stops for said detachable members preventing outward or downward movement when carriers are over said space, cables running over said members and attached to said carriers, dogging mechanism for preventing inward motion of said members, and posts on said carrier adapted to release said dogging mechanism as carrier is raised to elevation of said tracks, said dogging mechanism being provided with a curved tooth, and means for operating said cables.

15. A storage structure of the character described, comprising a framework, a plurality of vertically arranged cellular compartments, said framework providing an elevating space adjacent said compartments, carriers normally located in said compartments, supporting tracks for carriers, detachable members carried by said carriers when at the elevation of their respective tracks, stops for said detachable members preventing outward or downward movement when carriers are over said space, cables running over said members and attached to said carriers, and means for preventing inward motion of said members except when the carriers are opposite their respective compartments, and means for operating said cables.

16. A storage structure of the character described, comprising a framework, a plurality of vertically arranged cellular compartments, said framework providing an elevating space adjacent said compartments, carriers normally located in said compartments, supporting tracks for carriers, detachable members carried by said carriers when at the elevation of their respective tracks, stops for said detachable members preventing outward or downward movement when carriers are over said space, cables running over said members and attached to said carriers, dogging mechanism for preventing inward motion of said members, means for releasing automatically said dogging mechanism when carriers are raised to elevation of said tracks, said dogging mechanism having an oblique contacting surface whereby it is released gradually and means for operating said cables.

17. A storage structure of the character described, comprising a framework, a plurality of vertically arranged cellular compartments, said framework providing an elevating space adjacent said compartments, carriers normally located in said compartments, detachable members for said carriers, cable means running over said detachable members and attached to said carriers, stops for said detachable members, means for operating said cables, and independent means for locking said carriers in said compartments.

18. A structure of the character described comprising a framework forming a plurality of cellular compartments, carriers normally located in said compartments, and means individual to each carrier for raising and lowering said carriers to and from said compartments.

19. A storage structure of the character described, comprising a framework, a plurality of vertically arranged cellular compartments, said framework providing an elevating space adjacent said compartments, carriers normally located in said compartments, supporting tracks for carriers, detachable members carried by said carriers when at the elevation of their respective tracks, stops for said detachable members preventing outward or downward movement when carriers are over said space, cables running over said members and attached to said carriers, dogging mechanism for preventing inward motion of said members, and means for releasing automatically said dogging mechanism when carriers are raised to elevation of said tracks, means on said carriers preventing rotation of said detachable members when attached to said carriers, and means operating said cables.

In testimony whereof, I have signed my name to this specification.

HAROLD P. BURRELL.